(12) United States Patent
Wang et al.

(10) Patent No.: US 7,371,002 B2
(45) Date of Patent: May 13, 2008

(54) BACK LIGHT MODULE AND SYSTEM FOR LIQUID CRYSTAL PANELS

(75) Inventors: Tzuchang Wang, Tainan County (TW); Shunta Hong, Tainan County (TW)

(73) Assignee: Chi Mei Optoelectronics Corp. (TW)

( * ) Notice: Subject to any disclaimer, the term of this patent is extended or adjusted under 35 U.S.C. 154(b) by 243 days.

(21) Appl. No.: 11/123,847

(22) Filed: May 6, 2005

(65) Prior Publication Data
US 2005/0265048 A1  Dec. 1, 2005

(30) Foreign Application Priority Data
May 11, 2004 (TW) ............................... 93113243 A

(51) Int. Cl.
*F21V 7/04* (2006.01)
(52) U.S. Cl. ...................... 362/633; 362/621; 362/622; 349/58
(58) Field of Classification Search ................ 362/612, 362/613, 614, 615, 621, 622, 623, 624, 632, 362/633; 349/58, 59
See application file for complete search history.

(56) References Cited

U.S. PATENT DOCUMENTS

| 5,815,227 | A | 9/1998 | Lee |
| 6,799,860 | B2 * | 10/2004 | Nakaoka et al. ............ 362/615 |
| 6,935,766 | B2 | 8/2005 | Ato |
| 7,126,650 | B2 | 10/2006 | Nagahama |

FOREIGN PATENT DOCUMENTS

| JP | 11-084351 | 3/1999 |
| WO | WO 03042751 A1 | 5/2003 |

\* cited by examiner

*Primary Examiner*—John Anthony Ward
(74) *Attorney, Agent, or Firm*—Townsend and Townsend and Crew LLP

(57) ABSTRACT

A back light module for a liquid crystal display. The module has a rear cover, a reflective film and a high-reflective mode frame. The rear cover has a bottom plate and a side plate; a first side of the side plate is connected to a side of the bottom plate. The reflective film is disposed on a top surface of the bottom plate and an internal side surface, so as to replace a lamp reflector. The high-reflective mode frame is put on the second side, which is opposite the first side of the side plate.

23 Claims, 7 Drawing Sheets

BACK LIGHT MODULE AND SYSTEM FOR LIQUID CRYSTAL PANELS

CROSS-REFERENCE TO RELATED APPLICATION

The instant nonprovisional patent application claims priority to Taiwanese Patent Application No. 93113243, filed May 11, 2004 and incorporated by reference herein for all purposes.

BACKGROUND OF THE INVENTION

The present invention relates to a liquid crystal panels. More particularly, the present invention provides a back light module including an edge-type back light module for a liquid crystal panel. But it would be recognized that the invention has a much broader range of applicability.

Electronic display technologies have rapidly developed over the years. From the early days, cathode ray tube technology, commonly called CRTs, outputted selected pixel elements onto a glass screen in conventional television sets. These television sets originally output black and white moving pictures. Color television sets soon replaced most if not all black and white television units. Although very successful, CRTs were often bulky, difficult to make larger, and had other limitations.

CRTs were soon replaced, at least in part, with liquid crystal panel displays. These liquid crystal panel displays commonly called LCDs used an array of transistor elements coupled to a liquid crystal material and color filter to output moving pictures in color. Many computer terminals and smaller display devices often relied upon LCDs to output video, text, and other visual features. Various components make up the LCD display. As merely an example, a back light module is one of the key components of a liquid crystal panel. Since liquid crystals cannot emit light, the back light module provides a light source of sufficient brightness and uniformity, so that the liquid crystal can provide display images of normal and uniform brightness.

Referring to FIG. 1, a cross-sectional view of a back light module of a conventional liquid crystal display device has been illustrated. The back light module 100 of the conventional liquid crystal display device is an edge-type back light module. The back light module 100 includes a rear cover 102, and the rear cover 102 is mainly composed of a bottom plate 104 and a side plate 106 surrounding the bottom plate 104. An edge of the side plate 106 is joined to an edge of the bottom plate 104 at about 90 degrees. A reflective sheet 110 is adhered to a top surface of the bottom plate 104, a cold cathode fluorescent lamp (CCFL) 114 used for providing light is installed in the interior of the rear cover 102 adjacent to an inner side of the side plate 106, and a lamp reflector 112 is installed close to the inner side of the side plate 106. The lamp reflector 112 is between the cold cathode fluorescent lamp 114 and the side plate 106 of the rear cover 102. A cross-sectional profile of the lamp reflector 112 is U-shaped, a bottom surface of the lamp reflector 112 stays close to the side plate 106, and two side surface of the lamp reflector 112 extend outward from two edges of the bottom surface of the lamp reflector 112 and straightly over the bottom plate 104 and the cold cathode fluorescent lamp 114, respectively.

A light guide plate 108 is installed over the reflective sheet 110 in the interior of the rear cover 102 and surrounded by the cold cathode fluorescent lamp 114. The light guide plate 108 is principally used for guiding the location light emission, to enhance the luminance of a panel and to maintain the illumination uniformity of panel. The reflective sheet 110 and the lamp reflector 112 are used to reflect or guide the light emitted by the cold cathode fluorescent lamp 114 to the light guide plate 108, so as to increase the efficiency of light use. A diffusion sheet 116 located on the light guide plate 108 is used to keep the distribution of the light emitted from the light guide plate 108 more uniform. Furthermore, a prism sheet (not shown) with a light-condensing property is set on the diffusion sheet 116 to increase the orientation of the emitting light, thereby achieving the objective of enhancing the front illumination of the panel. After the diffusion sheet 116 is set, mode frames 118 are installed on another edge of the side plate 106 to cover an upper side of the lamp reflector 112, a portion of the light guide plate 108 and a portion of the diffusion sheet 116.

The edge-type back light module is set with a reflective sheet and a lamp reflector, and the lamp reflector is expensive, comprising about 7% of the cost of the back light module, so that the lamp reflector becomes a burdensome cost in fabricating the back light module.

From the above, it seen that an improved display is highly desirable.

BRIEF SUMMARY OF THE INVENTION

According to the present invention, techniques related to a liquid crystal panels are included. More particularly, the present invention provides a back light module, and more particularly, to including an edge-type back light module for a liquid crystal panel. But it would be recognized that the invention has a much broader range of applicability.

In a specific embodiment, the present invention provides a back light module, in which a reflective sheet is set in the interior of a rear cover of the back light module, so that a lamp reflector can be replaced to reduce the cost of the back light module. Here, the term "back" does not have any special meaning with respect to gravity or other fixed reference point, but should be interpreted according to one of ordinary skill in the art.

Another embodiment of the present invention provides a back light module of a liquid crystal display device, in which a white reflective paint layer is coated on the interior of a metal rear cover and can replace the reflective sheet and the lamp reflector. Here, the term "rear" does not have any special meaning with respect to gravity or other fixed reference point, but should be interpreted according to one of ordinary skill in the art. Therefore, the cost of the back light module can be reduced greatly. Additionally, the reflective film is directly coated on the metal rear cover; the direct heat dissipating effect can thus be achieved by the metal rear cover to enhance substantially the heat dissipation efficiency of the back light module.

Still another embodiment of the present invention provides a back light module of a liquid crystal display device, in which a plurality of positioning sheets and a plurality of openings corresponding to the positioning sheets are set in a bottom plate of a metal rear cover, and a plurality of slots with locations and sizes corresponding to the positioning sheets are set in a reflective sheet. Therefore, the reflective sheet can be effectively fixed on the bottom plate of the metal rear cover.

According to the aforementioned description, the present invention provides a back light module comprising: a rear cover, a reflective film and a high-reflective mode frame. The rear cover comprises a bottom plate and a side plate, and a first edge of the side plate is joined to an edge of the bottom plate. The reflective film is disposed on a top surface of the bottom plate and an inner side surface of the side plate. The high-reflective mode frame is set on a second edge of the side plate opposite the first edge.

According to a preferred embodiment of the present invention, a material of the reflective film is a white reflective paint layer with anti-yellowing and heat-resistant properties. The white reflective paint layer is coated on the interior of the rear cover, so a lamp reflector and a reflective sheet can be replaced to reduce greatly the cost of the back light module. As merely an example, the white reflective paint is manufactured by TAI YING PAINT INDUSTRIAL CO., LTD. and called PU 800 White, Product Number: T3U8W01, but other types of paint products and/or coatings can be used, depending upon the embodiment. Furthermore, the bottom plate of the rear cover is punched to form a plurality of positioning sheets protruding through the top surface of the bottom plate and to form a plurality of corresponding openings in the bottom plate. At least one of the positioning sheets is formed having a curve in at least one corner of the bottom plate, and a corner of the light guide plate corresponding to the at least one corner of the bottom plate having the curve has a cut breach, such as a triangle cut breach. Therefore, when the light guide plate is put into the interior of the rear cover, the collocation of the curved position sheet and the cut breach of the light guide plate can provide a foolproof function and can effectively fix the light guide plate. In addition, electrodes of the cold cathode fluorescent lamp can be set in a part of the openings for the heat dissipating benefit of the electrodes. Further, because it is not necessary to install a lamp reflector, a line assembling trace of the connecting lines may run through at least one opening in a top surface of the high-reflective mode frame on the back light module, thereby enhancing the convenience of assembling the connecting lines.

Various additional objects, features and advantages of the present invention can be more fully appreciated with reference to the detailed description and accompanying drawings that follow.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE INVENTION

According to the present invention, techniques related to a liquid crystal panels are included. More particularly, the present invention provides a back light module, and more particularly, to including an edge-type back light module for a liquid crystal panel. But it would be recognized that the invention has a much broader range of applicability. In order to make the illustration of embodiments of the present invention more explicit and complete, the following description is stated with reference to FIG. 2 to FIG. 7.

A liquid crystal display device is typically composed of a panel, a back light module and a frame, in which the panel is located on the back light module, and the frame is located on the panel. After the frame is assembled with the back light module, the panel is fixed between the frame and the back light module to complete the basic structure of the liquid crystal display device.

Figure 1:
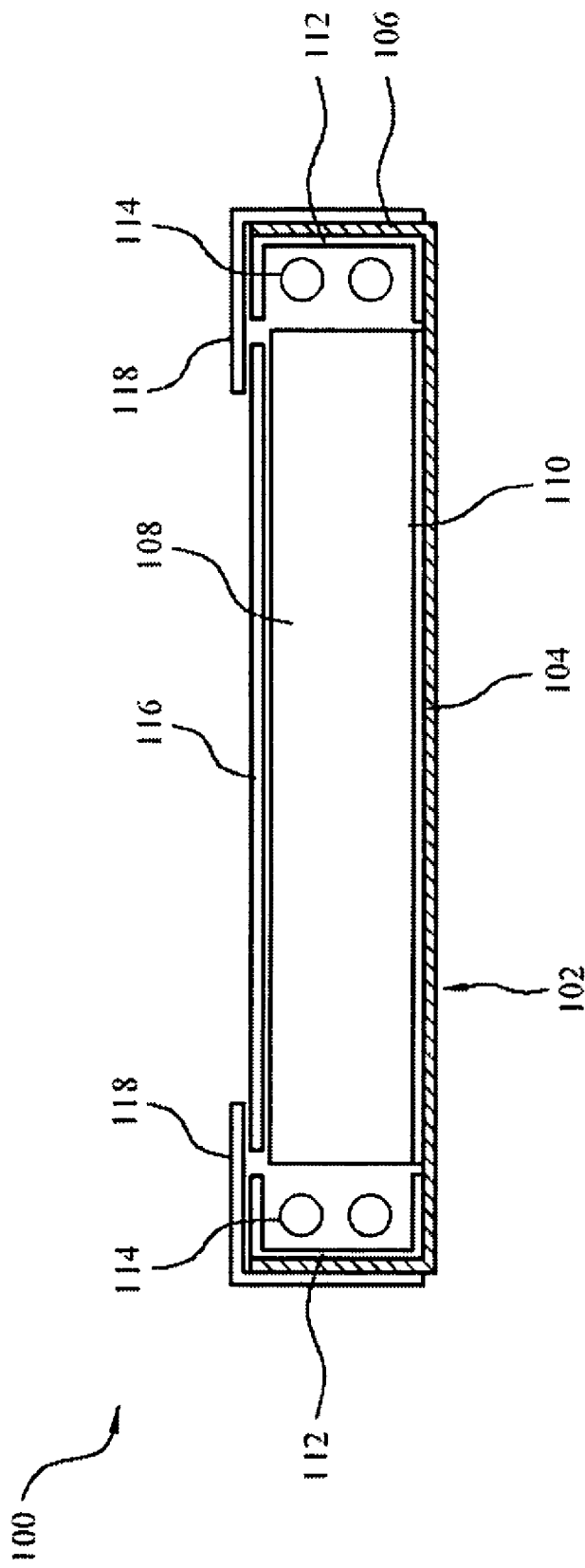
FIG. 1 illustrates a cross-sectional view of a back light module of a conventional liquid crystal display device.
Figure 2:
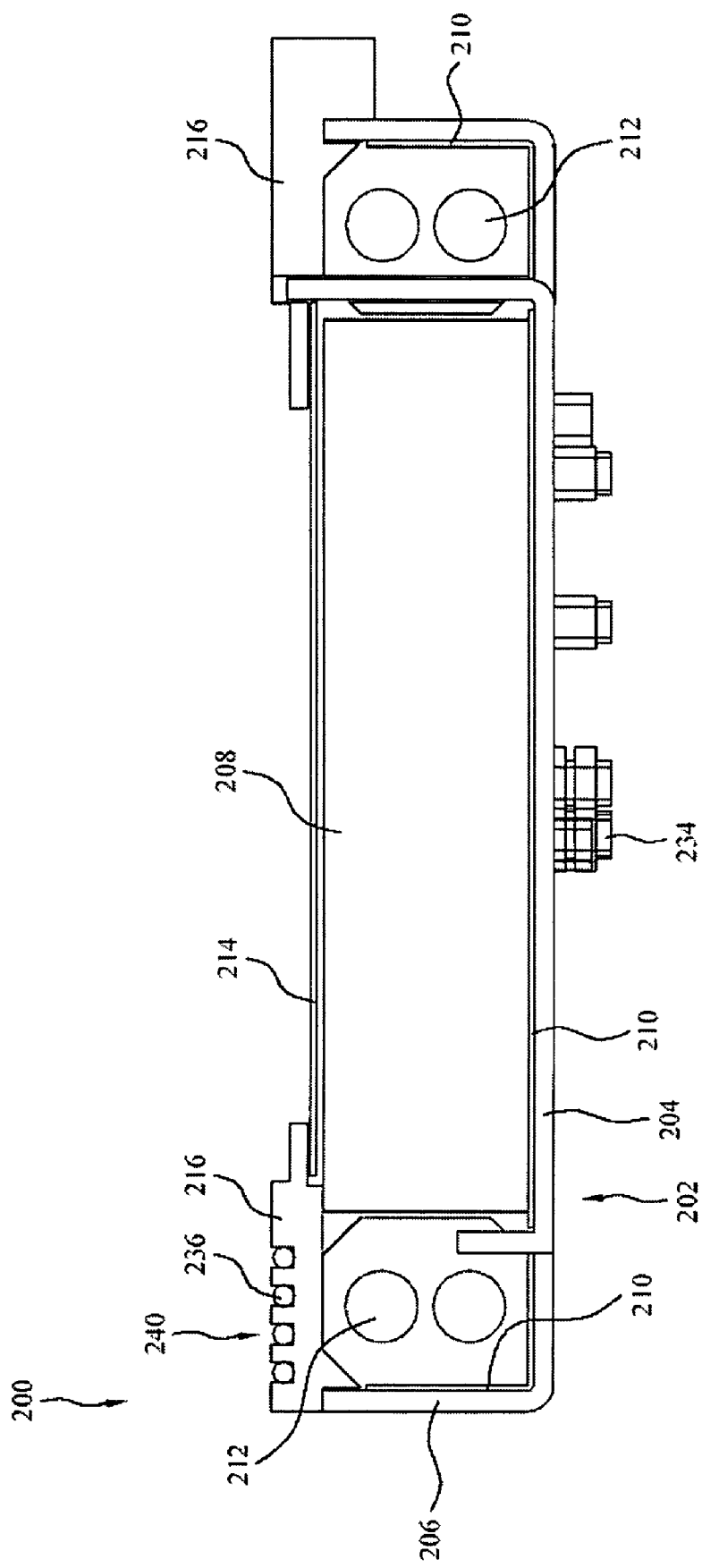
FIG. 2 illustrates a simplified cross-sectional view of a back light module in accordance with a preferred embodiment of the present invention.
Figure 3:
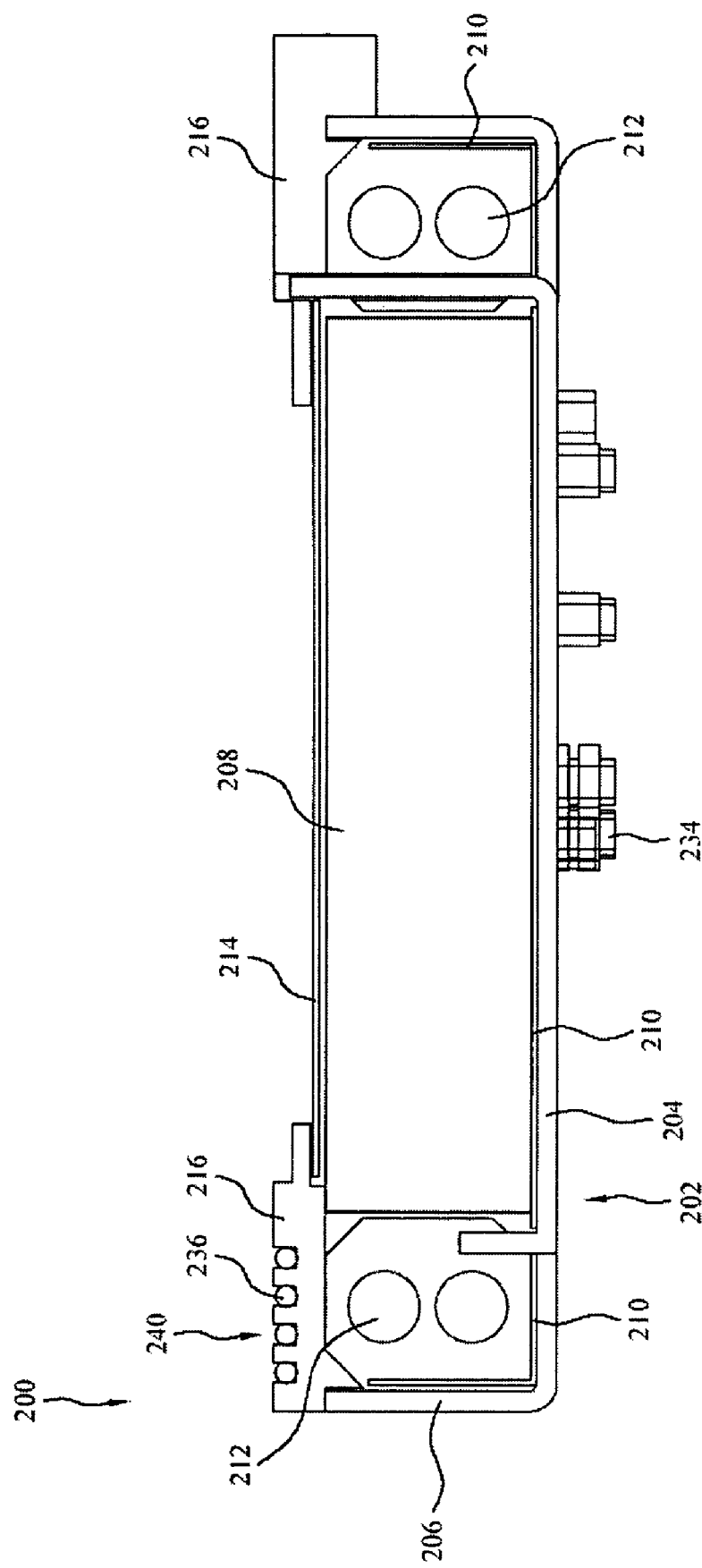
FIG. 3 illustrates a simplified cross-sectional view of a back light module in accordance with another preferred embodiment of the present invention.
Figure 4:
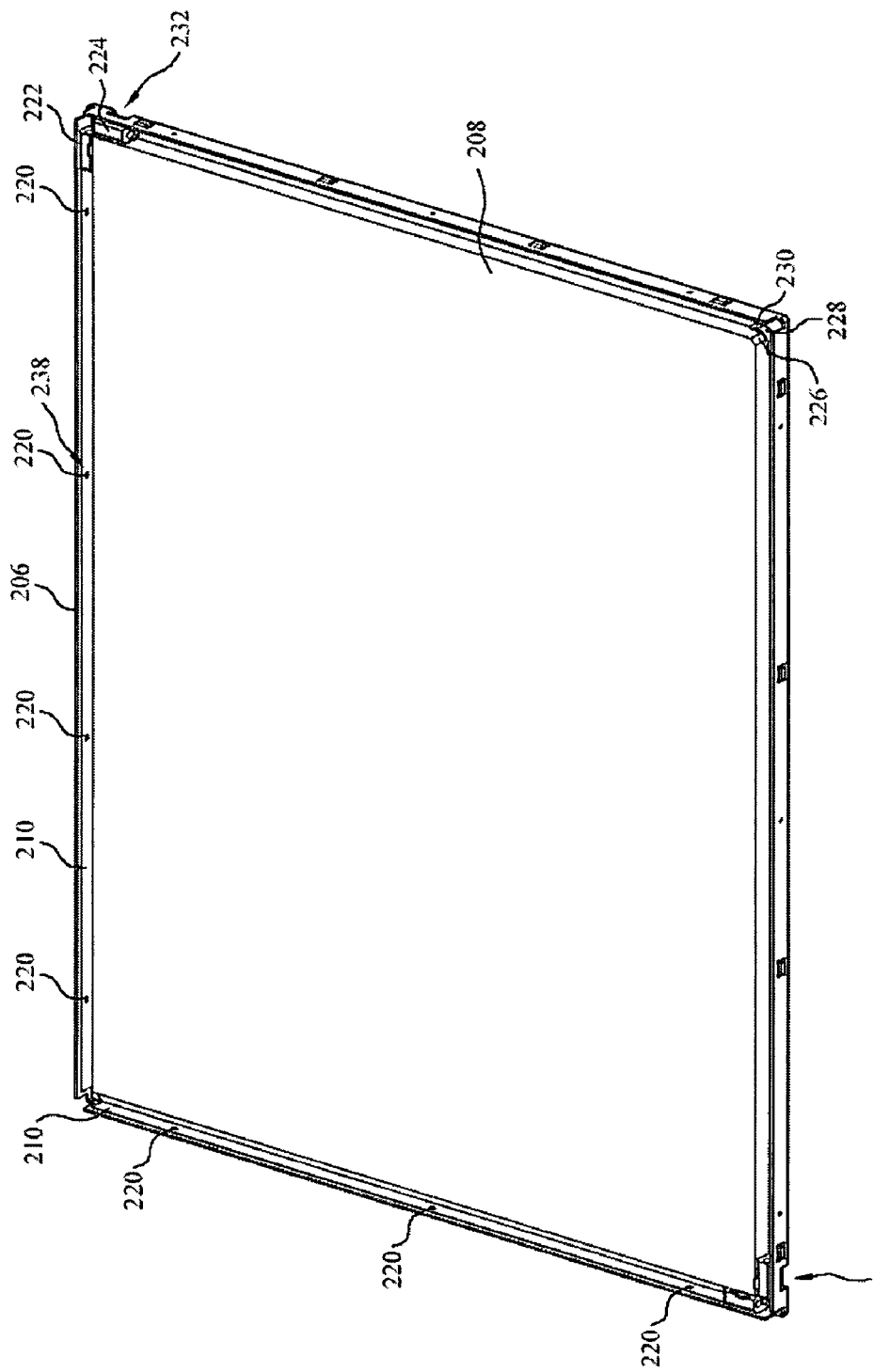
FIG. 4 illustrates a simplified three-dimensional diagram of a back light module in accordance with a preferred embodiment of the present invention.

Referring to FIG. 2, a cross-sectional view of a back light module in accordance with a preferred embodiment of the present invention is illustrated. This diagram is merely an example, which should not unduly limit the scope of the claims herein. One of ordinary skill in the art would recognize many variations, modifications, and alternatives. As shown, the back light module 200 is one of the key components of a liquid crystal display device, and the back light module 200 is mainly composed of a rear cover 202, a light guide plate 208, at least a cold cathode fluorescent lamp 212, a diffusion sheet 214 and a mode frame 216, and other elements. The rear cover 202 is preferably composed of a material with high thermal conductivity, such as metal, or other combination of materials that may include metals or metallic species. In a specific embodiment of the present invention, the material of the rear cover 202 can be galvanized steel plate, stainless steel plate, or aluminum plate, or multi-layered materials, or any combination of these. The rear cover 202 comprises a bottom plate 204 and a side plate 206, in which an edge of the side plate 206 is joined to an edge of the bottom plate 204, and another edge of the side plate 206 opposite the edge joined to the edge of the bottom plate 204 forms an opening of the rear cover 202, as shown in FIG. 4. A top surface of the bottom plate 204 of the rear cover 202 and an inner side surface of the side plate 206 are both covered with a reflective film 210. In the present invention, as shown in FIG. 2, a material of the reflective film 210 is preferably a white reflective paint layer covering the top surface of the bottom plate 204 and the inner side surface of the side plate 206 by coating, and the reflective film 210 preferably has anti-yellowing and heat-resistant properties. In addition, the reflective film 210 can be a white reflective sheet covering the top surface of the bottom plate 204 and the inner side surface of the side plate 206 by putting, as shown in FIG. 3, where the reflective film 210 preferably has anti-yellowing and heat-resistant properties. In a preferred embodiment, the white reflective plate 206 can be stuck to cover the top surface of the bottom plate 204 and the inner side surface of the side plate 206 by using an adhesive material.

In a preferred embodiment of the present invention, when the reflective film 210 is a white reflective sheet, to achieve the objective of effectively fixing the reflective film 210, position sheets 230 can be formed and protrude from the top surface of the bottom plate 204 by punching the bottom plate 204 of the rear cover 202, as illustrated in FIG. 4 to FIG. 7. Openings (not shown) with a size slightly larger than that of the side surfaces the position sheets 230 are set on the reflective film 210 corresponding to the position sheets 230. Accordingly, when the sheet-like reflective film 210 is disposed in the interior of the rear cover 202, the positioning sheets 230 can be inserted into the openings of the reflective film 210, so that the location of the reflective film 210 can be effectively fixed in the bottom plate 204 to prevent the reflective film 210 from shifting caused by slipping. Furthermore, referring to FIG. 4, a plurality of positioning bumps 220 can be set in the side plate 206 of the rear cover 202. In forming the positioning bumps 220, the side plate 206 is punched from the outer side of the side plate 206 to the inner side to form a plurality of punching holes 218, so that the positioning bumps 220 corresponding to the punching holes 218 and spreading outwardly are formed on the inner side surface of the side plate 206. A plurality of fixing holes 238 with a size slightly smaller than that of the positioning bumps 220 are set at the positions, which correspond to the positions of the positioning bumps 220, in the sheet-like reflective film 210. Accordingly, when the sheet-like reflective film 210 is installed into the interior of the rear cover 202, the positioning holes 238 in the reflective film 210 can be inserted by the corresponding position bumps 220, and then the positioning bumps 220 spreading outwardly are used to fix the side portions of the reflective film 210 on the inner side surface of the side plate 206.

In a preferred embodiment of the present invention, a plurality of positioning sheets 230 may be set in the bottom plate 204, where a part of the positioning sheets 230 may be located in at least one corner, and preferably two opposite corners, and the positioning sheets 230 in the corners are formed with curves 228, such as arched curves, as illustrated in FIG. 4. Each of the curves 228 is formed by at least one of the positioning sheets 230.

In addition, the light guide plate 208 is disposed on the reflective film 210 in the interior of the rear cover 202, and in the light guide plate 208, which corners corresponding to the corners of the bottom plate 204 having the positioning sheets 230 with the curves 228 can be respectively set with a cut breach 226, such as a triangle cut breach. Thus, each corner of the light guide plate 208 having the cut breach 226 can be smoothly disposed into the corner of the bottom plate 204 having the positioning sheet 230 with the curve 228. The corners of the light guide plate 208 having cut breaches 226 and the corners of the bottom plate 230 having the positioning sheets 230 with the curves 228 constitute a foolproof design for installing the light guide plate 208. For example, when the corner of the light guide plate 208 is formed in a right angle, the right-angled corner of the light guide plate 208 cannot be disposed into the corner of the bottom plate 204 having the positioning sheet 230 with the curve 228, such as an arched curve, due to the restriction of the positioning sheet 230 with the curve 228.

After the bottom plate 204 is punched to form the positioning sheets 230 on the top surface of the bottom plate 204, openings 232 are formed at the places, which are relating to the positioning sheets 230, in the bottom plate 204. The sizes are the same with those of the relating positioning sheets 230. The cold cathode fluorescent lamp 212 is installed surrounding the inner side surface of the side plate 206 of the rear cover 202, and the cold cathode fluorescent lamp 212 is located between the sides of the light guide plate 208 and the side parts of the reflective film 210. The cold cathode fluorescent lamp 212 can be a single or multiple lamp design. Further, the cold cathode fluorescent lamp 212 can be a rectilinear lamp or an L-shaped lamp, among others. The cold cathode fluorescent lamp 212 includes two sets of electrodes 222 and 224 with opposite polarities. The locations of the openings 232 are preferably at the corners of the rear cover 202 and corresponding to those of the electrodes 222 and 224. When the back light module 200 is operating, the electrodes 222 and 224 induce more waste heat, so it is easier for the electrodes 222 and 224 to dissipate heat by installing the electrodes 222 and 224 in the openings 232 of the rear cover 202, thereby greatly increasing the heat-dissipating efficiency of the electrodes 222 and 224. Moreover, in order to prevent the cold cathode fluorescent lamp 212 from slipping, the cold cathode fluorescent lamp 212 may be equipped with at least one lamp fixed support to fix the cold cathode fluorescent lamp 212.

The diffusion sheet 214 is flatly disposed on the light guide plate 208, and a plurality of slots are set at the places, which are corresponding to the locations of the positioning sheets 230, in the diffusion sheet 214, so that the location of the diffusion sheet 214 can be effectively fixed on the light guide plate 208, to prevent the diffusion sheet 214 from shifting caused by slipping. The mode frame 216 is installed on the edge of the side plate 206 forming the opening. The mode frame 216 extends toward the inside of the rear cover 202, and the mode frame 216 covers the space between the light guide plate 208 and the side plate 206, the whole cold cathode fluorescent lamp 212, and the rim of the light guide plate 208 and the rim of the diffusion sheet 214. In the present invention, the mode frame 216 is composed of a high-reflective material, such as polycarbonate (PC), although other materials may be used.

In a specific embodiment of the present invention, includes by way of coating or putting of the reflective film 210 on the top surface of the bottom plate 204 and the inner side surface of the side plate 206 in the rear cover 202, and use of the high-reflective mode frame 216, the light emitted by the cold cathode fluorescent lamp 212 can be successfully reflected, so the conventional lamp reflector can be replaced. In the preferred embodiment of the present invention, by coating a white reflective paint on the top surface of the bottom plate 204 and the inner side surface of the side plate 206 in the rear cover 202 as the reflective film 210 and using the high-reflective mode frame 216, the cost of the back light module 200 can be reduced by about 11% to 13% according to a specific embodiment. Further, because the heat can be directly transmitted to the rear cover 202 coated by the white reflective paint, and the rear cover 2002 is composed of the material with high thermal conductivity, the heat-dissipating efficiency of the back light module 200 can be effectively enhanced.

Figure 5:
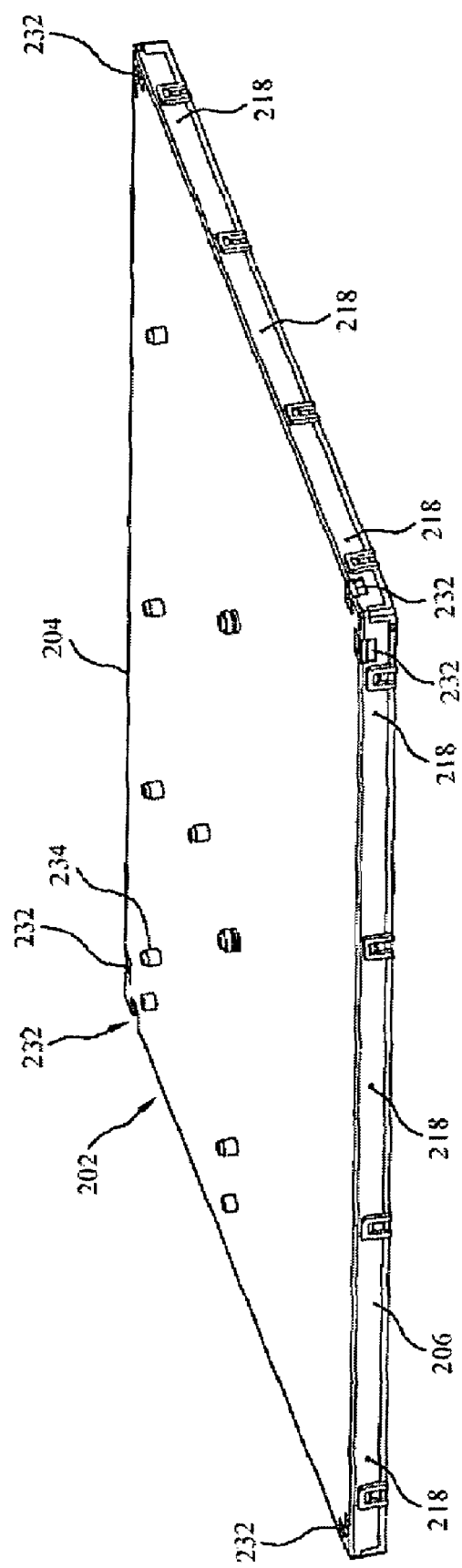
FIG. 5 illustrates a simplified three-dimensional diagram of a back side of a rear cover of a back light module in accordance with a preferred embodiment of the present invention.
Figure 6:
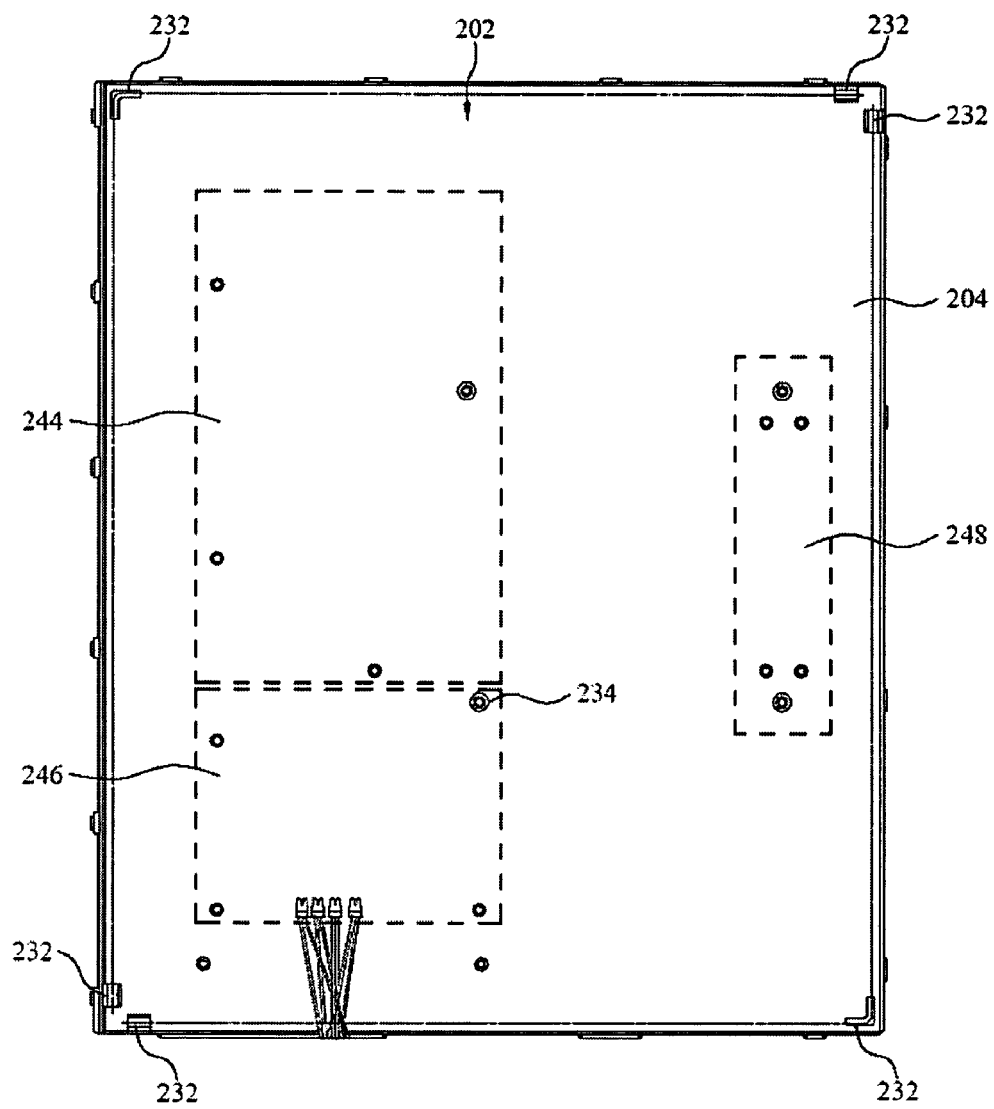
FIG. 6 illustrates a simplified top view of a backside of a rear cover of a back light module in accordance with a preferred embodiment of the present invention.

Referring to FIG. 5 and FIG. 6, the bottom plate 204 of the rear cover 202 can comprise a plurality of bosses 234 protruding from the backside surface of the bottom plate 204 according to the need of the device. Outer devices, such as an AD board, an inverter and a hinge, can be screwed and fixed on the bottom plate 204 of the rear cover 202, such as an AD board locking site 244, an inverter locking site 246 and a hinge locking site 248, by the bosses 234 and a plurality of locking elements, such as screws. The surfaces of the bosses 234 joined to the bottom plate 204 are coated with white reflective films to prevent light leakage.

Figure 7:
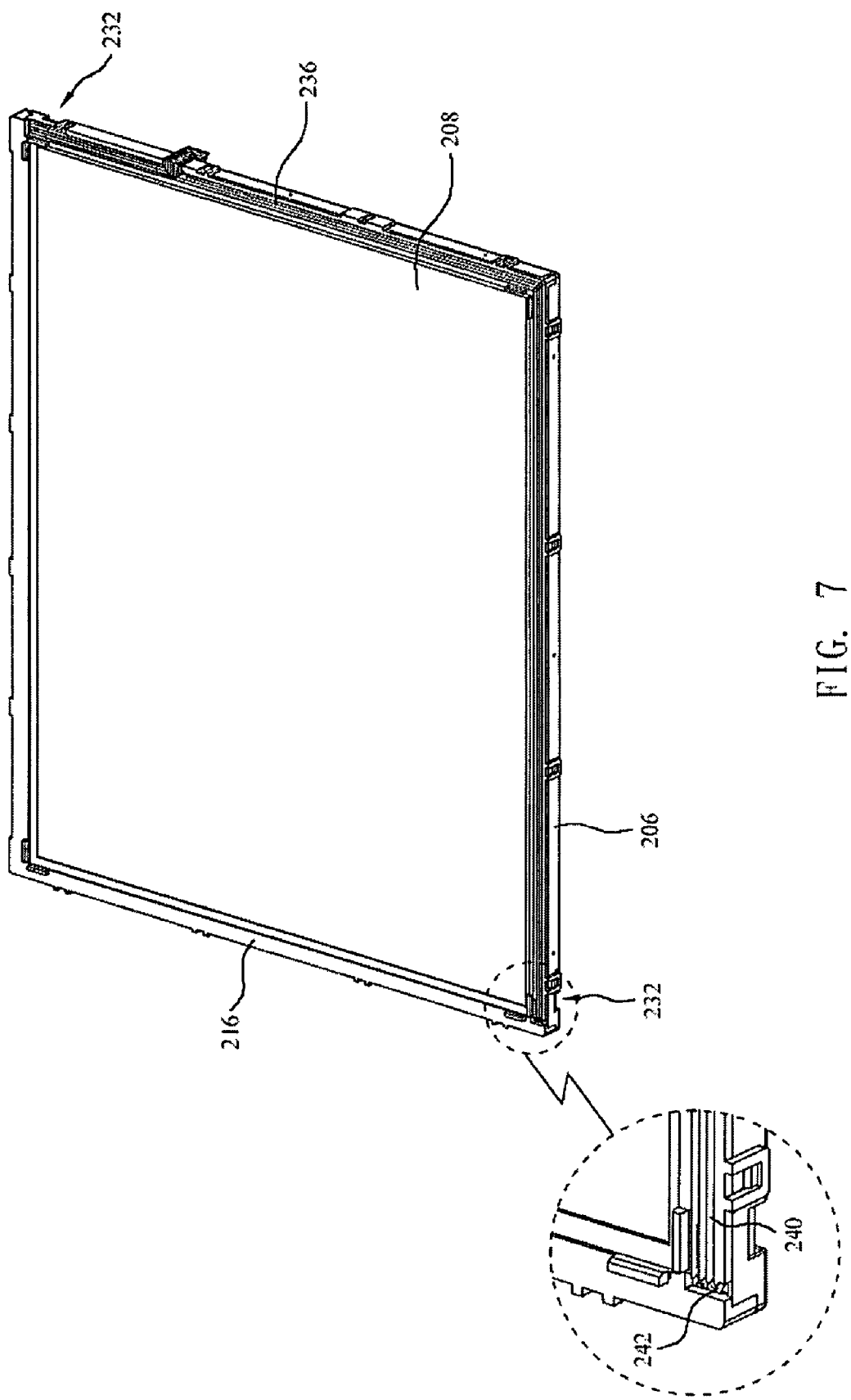
FIG. 7 illustrates a simplified diagram of a line assembling trace of connecting lines of a back light module in accordance with a preferred embodiment of the present invention.

Referring to FIG. 7, the cold cathode fluorescent lamp 212 further comprises a plurality of connecting lines 236, and a line assembling trace of the connecting lines 236 preferably runs through a top surface of the high-reflective mode frame 216 on the back light module 200. A plurality of fillisters are set on the top surface of the mode frame 216 by injection molding, for a benefit of assembling the connecting lines 236 of the cold cathode fluorescent lamp 212, as shown in FIG. 2, FIG. 3 and FIG. 7. In the preferred embodiment of the present invention, the top surface of the mode frame 216 further includes at least one opening 242 through which the connecting lines 236 to facilitate line-assembling, as shown in FIG. 7.

According to the aforementioned description, an advantage of the present invention is that by setting a reflective sheet in the interior of a rear cover of a back light module, a lamp reflector of a conventional back light module can be replaced to reduce a cost of the back light module.

According to the aforementioned description, another advantage of the present invention is that by coating white reflective paint film on the interior of a metal rear cover of a back light module as a reflective film, a reflective sheet and a lamp reflector in a conventional back light module can be replaced. Therefore, the cost of the back light module can be reduced greatly. Additionally, the reflective film is directly coated on the rear cover composed of the material with high thermal conductivity; thus the direct heat dissipating effect can be achieved by the rear cover with high thermal conductivity to enhance substantially the heat dissipation efficiency of the back light module.

According to the aforementioned description, still another advantage of the present invention is that a plurality of positioning sheets and a plurality of openings corresponding to the positioning sheets are set in a bottom plate of a rear cover, and a plurality of slots with locations and sizes corresponding to the positioning sheets are set in a reflective sheet. Therefore, the reflective sheet can be effectively fixed on the bottom plate of the metal rear cover.

As is understood by a person skilled in the art, the foregoing preferred embodiments of the present invention are illustrative of the present invention rather than limiting of the present invention. It is intended to cover various modifications and similar arrangements be included within the spirit and scope of the appended claims, the scope of which should be accorded the broadest interpretation so as to encompass all such modifications and similar structures.

What is claimed is:

1. A back light module for a display panel, comprising:
a rear cover, the rear cover comprising a bottom plate and a side plate coupled to the bottom plate, the side plate having a first edge region, a second edge region, and an inner side surface, the first edge region being coupled to the bottom plate, the bottom plate comprising an edge region and a top surface, the edge region being joined to the first edge region of the side plate;
a light source disposed in the interior of the rear cover;
a light guide plate disposed in the interior of the rear cover and comprising an incident surface facing the light source;
a reflective film disposed overlaying the top surface of the bottom plate and the inner side surface of the side plate; and
a reflective mode frame set on the second edge region of the side plate opposite the first edge region,
wherein the interior surface of the reflective mode frame and the reflective film are configured to reflect light from the light source to the incident surface of the light guide plate.

2. The back light module according to claim 1, wherein the rear cover is substantially a metal bearing material.

3. The back light module according to claim 1, wherein the rear cover is made of a material selected from the group consisting of galvanized steel plate, stainless steel plate, and aluminum plate.

4. The back light module according to claim 1, wherein the reflective film comprises a white reflective paint layer coated on the rear cover.

5. The back light module according to claim 1, wherein the reflective film comprises a white reflective sheet.

6. The back light module according to claim 5, wherein the bottom plate of the rear cover includes at least one positioning sheet protruding from the top surface of the bottom plate, and the reflective film is set within at least one slot corresponding to the at least one positioning sheet.

7. The back light module according to claim 6, further comprising a light guide plate disposed on the reflective film on the bottom plate.

8. The back light module according to claim 7, further comprising a diffusion sheet on the light guide plate, and a plurality of slots corresponding to the at least one positioning sheet provided by the diffusion sheet.

9. The back light module according to claim 7, wherein the light guide plate comprises at least one corner, the at least one corner has a cut breach, at least one corner of the bottom plate of the rear cover corresponding to the at least corner of the light guide plate has at least one positioning sheet with a curve protruding from the top surface of the bottom plate, and the cut breach of the at least corner of the light guide plate is coupled to the at least one positioning sheet in the at least one corner of the bottom plate.

10. The back light module according to claim 9, wherein the bottom plate of the rear cover comprises a plurality of openings, the plurality of openings comprising respective locations and sizes, each of the openings corresponding to the at least one positioning sheet of the bottom plate.

11. The back light module according to claim 10, wherein the light source comprises a cold cathode fluorescent lamp surrounding the inner side surface of the side plate of the rear cover, wherein the cold cathode fluorescent lamp includes two electrodes, and the electrodes are located in a part of the openings.

12. The back light module according to claim 1, wherein the inner side surface of the side plate of the rear cover comprises a plurality of positioning bumps, a plurality of positioning holes, corresponding to the positioning bumps, are set in the reflective film, and the positioning bumps are inserted into the corresponding positioning holes to maintain the reflective film to the inner side surface of the side plate of the rear cover.

13. The back light module according to claim 1, wherein the reflective film comprises a white reflective sheet characterized by an anti-yellowing and heat-resistant properties.

14. The back light module according to claim 1, wherein the light source includes at least one L-shaped cold cathode fluorescent lamp surrounding the inner side surface of the side plate of the rear cover.

15. The back light module according to claim 1, wherein the rear cover comprises a lower surface, the lower surface comprising a plurality of bosses, and surfaces of the bosses joined with the rear cover are coated with white reflective films.

16. The back light module according to claim 15, wherein the bosses, the rear cover and a plurality of outer devices are screwed altogether, and the outer devices comprises an AD board, an inverter and a hinge.

17. A liquid crystal display device, comprising:
a back light module, comprising:
- a rear cover, the rear cover comprising a bottom plate and a side plate coupled to the bottom plate, the side plate having a first edge region, a second edge region, and an inner side surface, the first edge region being coupled to the bottom plate, the bottom plate comprising an edge region and a top surface, the edge region being joined to the first edge region of the side plate;
- a light source disposed in the interior of the rear cover;
- a light guide plate disposed in the interior of the rear cover and comprising an incident surface facing the light source;
- a reflective film disposed overlaying the top surface of the bottom plate and the inner side surface of the side plate; and
- a reflective mode frame set on the second edge region of the side plate opposite the first edge region,
- wherein the interior surface of the reflective mode frame and the reflective film are configured to reflect light from the light source to the incident surface of the light guide plate;
a panel coupled to the back light module; and
a frame coupled to the panel, the frame being associated with the back light module to maintain the panel between the frame and the back light module.

18. The liquid crystal display device according to claim 17, wherein a material of the reflective film is a white reflective paint layer coated on the rear cover.

19. The liquid crystal display device according to claim 17, wherein a material of the reflective film is a white reflective sheet.

20. A method for assembling a liquid crystal display device, comprising:
providing a back light module, comprising:
- a rear cover, the rear cover comprising a bottom plate and a side plate coupled to the bottom plate, the side plate having a first edge region, a second edge region, and an inner side surface, the first edge region being coupled to the bottom plate, the bottom plate comprising an edge region and a top surface, the edge region being joined to the first edge region of the side plate;
- a light source disposed in the interior of the rear cover;
- a light guide plate disposed in the interior of the rear cover and comprising an incident surface facing the light source;
- a reflective film disposed overlaying the top surface of the bottom plate and the inner side surface of the side plate; and
- a reflective mode frame set on the second edge region of the side plate opposite the first edge region,
- wherein the interior surface of the reflective mode frame and the reflective film are configured to reflect light from the light source to the incident surface of the light guide plate;
coupling a panel to the back light module; and
coupling a frame to the panel, the frame being associated with the back light module to maintain the panel between the frame and the back light module.

21. The back light module for a display panel of claim 1, wherein the reflective mode frame comprises polycarbonate.

22. The back light module for a display panel of claim 1, wherein the reflective mode frame further comprises a plurality of fillisters on a top surface of the reflective mode frame.

23. A back light module for a display panel, comprising:
- a rear cover, the rear cover comprising a bottom plate and a side plate coupled to the bottom plate, the side plate having a first edge region, a second edge region, and an inner side surface, the first edge region being coupled to the bottom plate, the bottom plate comprising an edge region and a top surface, the edge region being joined to the first edge region of the side plate;
- a reflective film disposed overlaying the top surface of the bottom plate and the inner side surface of the side plate;
- a lamp disposed between the first edge region and the second edge region of the side plate;
- a light guide plate disposed in the interior of the rear cover and comprising an incident surface facing the lamp;
- one or more connecting lines coupled to the lamp; and
- a reflective mode frame set on the second edge region of the side plate opposite the first edge region, a top surface of the reflecting mode frame including at least an opening through which at least one of the one or more connecting lines is disposed,
- wherein the interior surface of the reflective mode frame and the reflective film are configured to reflect light from the light source to the incident surface of the light guide plate.

* * * * *